G. WRIGHT.
PANS AND BASINS

No. 189,590. Patented April 17, 1877.

Witnesses:
O. W. Bond
H. F. Brunt

Inventor:
George Wright
By Kell & Bond Attys

UNITED STATES PATENT OFFICE.

GEORGE WRIGHT, OF CHICAGO, ILLINOIS.

IMPROVEMENT IN PANS AND BASINS.

Specification forming part of Letters Patent No. 189,590, dated April 17, 1877; application filed March 27, 1877.

*To all whom it may concern:*

Be it known that I, GEORGE WRIGHT, of the city of Chicago, Cook county, State of Illinois, have invented a new and useful Improvement in Pans and Basins, of which the following is a full description, reference being had to the accompanying drawings, in which—

Figure 1:
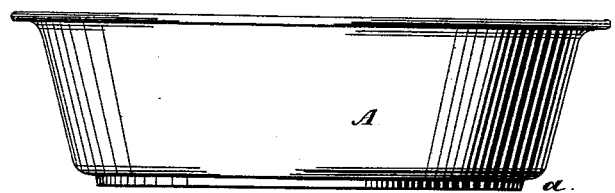
Figure 2:
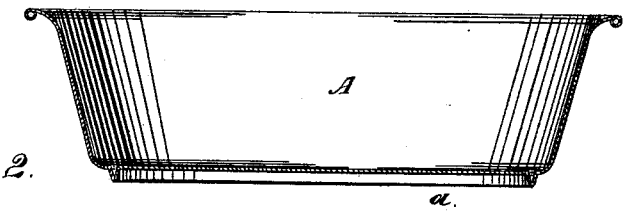
Figure 3:
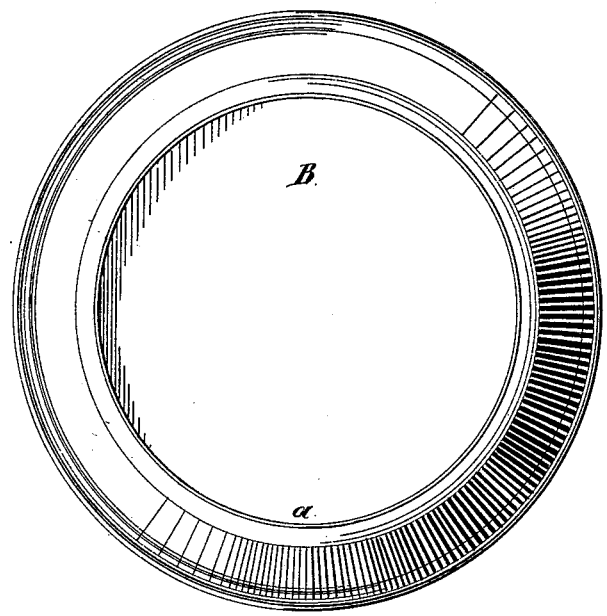
Figure 4:
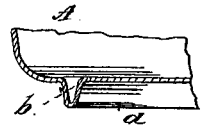
Figure 5:
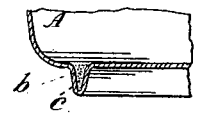
Figure 6:
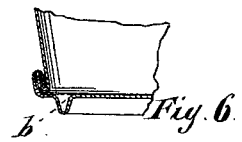
Figure 7:
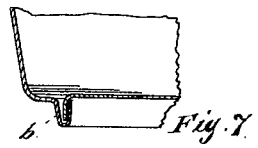

Figure 1 is a side elevation; Fig. 2, a vertical section; Fig. 3, a bottom view; Figs. 4 and 5, enlarged details; Figs. 6 and 7, variations.

The bottoms of sheet-metal pans and basins wear out very rapidly unless protected.

The object of this invention is to afford such protection in a cheap and efficient manner, which I accomplish by stamping a bead in the bottom of the pan and filling the same with solder.

Figs. 1, 2, and 3 represent a basin stamped up from a single piece of sheet metal, A being the side or body, and B the bottom, of such basin. After the basin has been formed in the usual manner it is placed in another press provided with suitable dies, and a bead, $a$, stamped in the bottom. The two parts of this bead form a groove, $b$, which is filled with solder or block tin $c$, as shown in Fig. 5.

It is essential to fill the groove $b$, because if not filled the edge of the bead will soon wear off, and the accumulation of moisture in the groove will produce rust in many cases.

In Fig. 6 is represented a pan made from two pieces in the usual manner, the bottom of which is provided with a bead, which is to be filled as before described.

In Fig. 7 is also represented a pan made in two parts, the bottom proper being bent and inserted in the groove of the bead which is to be filled, as before stated.

Pans and basins provided with a filled bead, as described, will be very durable, as it will be evident that the bead can wear down to the bottom of the pan without injury thereto.

This construction is especially adapted to pans and basins made from tin, though it may be used with other material.

What I claim as new, and desire to secure by Letters Patent, is as follows:

As an improved article of manufacture, a sheet-metal pan or basin, provided with a bead, $a$, upon the bottom thereof, such bead being filled with solder or block tin, or other suitable material, substantially as and for the purpose specified.

GEORGE WRIGHT.

Witnesses:
 O. W. BOND,
 H. F. BRUNS.